United States Patent
Suzuki et al.

(10) Patent No.: US 10,094,976 B2
(45) Date of Patent: Oct. 9, 2018

(54) DISPERSION SHIFTED OPTICAL FIBER

(71) Applicant: FUJIKURA LTD., Tokyo (JP)

(72) Inventors: Takaaki Suzuki, Chiba (JP); Shoichiro Matsuo, Chiba (JP)

(73) Assignee: FUJIKURA LTD., Tokyo (JP)

( * ) Notice: Subject to any disclaimer, the term of this patent is extended or adjusted under 35 U.S.C. 154(b) by 15 days.

(21) Appl. No.: 15/547,265

(22) PCT Filed: Jan. 25, 2016

(86) PCT No.: PCT/JP2016/051995
§ 371 (c)(1),
(2) Date: Jul. 28, 2017

(87) PCT Pub. No.: WO2016/129367
PCT Pub. Date: Aug. 18, 2016

(65) Prior Publication Data
US 2018/0011245 A1    Jan. 11, 2018

(30) Foreign Application Priority Data
Feb. 12, 2015    (JP) .................. 2015-025006

(51) Int. Cl.
  G02B 6/036    (2006.01)
  G02B 6/028    (2006.01)
  G02B 6/02     (2006.01)

(52) U.S. Cl.
  CPC ....... *G02B 6/03672* (2013.01); *G02B 6/0283* (2013.01); *G02B 6/02276* (2013.01); *G02B 6/03644* (2013.01)

(58) Field of Classification Search
  CPC ............ G02B 6/03672; G02B 6/02276; G02B 6/0283; G02B 6/03644
  See application file for complete search history.

(56) References Cited

U.S. PATENT DOCUMENTS

| | | | | |
|---|---|---|---|---|
| 4,852,968 A | * | 8/1989 | Reed ................. | G02B 6/02238 250/227.28 |
| 5,649,044 A | * | 7/1997 | Bhagavatula ...... | G02B 6/02014 385/123 |

(Continued)

FOREIGN PATENT DOCUMENTS

| | | |
|---|---|---|
| EP | 2821822 A1 | 1/2015 |
| JP | 2003-515755 A | 5/2003 |

(Continued)

OTHER PUBLICATIONS

Raja et al., An optimized design for non-zero dispersion shifted fiber with reduced nonlinear effects for future optical networks, Optica Applicata, vol. XLIV, No. 4, 2014.*

*Primary Examiner* — Peter Radkowski
(74) *Attorney, Agent, or Firm* — Osha Liang LLP (57) ABSTRACT

A dispersion shifted optical fiber where a radius $r_0$ of a first center segment is 0.5 μm to 2.8 μm, and a relative refractive index difference $\Delta_0$ is 0.4% or more and 0.9% or less. A radius $r_1$ of a first segment is 1.8 μm or more and 4.5 μm or less. A radius $r_2$ of a second segment is 4.0 μm or more and 8.0 μm or less, and a relative refractive index difference $\Delta_2$ is 0.00% or more and 0.07% or less. A radius $r_3$ of a third segment is 4.5 μm or more and 8.5 μm or less, and a relative refractive index difference $\Delta_3$ is 0.285% or more and 0.5% or less. A radius $r_4$ of a fourth segment is 8.0 μm or more and 16.0 μm or less, and a relative refractive index difference $\Delta_4$ is 0.005% or more and 0.04% or less.

6 Claims, 2 Drawing Sheets

(56) References Cited

U.S. PATENT DOCUMENTS

| | | | | |
|---|---|---|---|---|
| 6,134,367 | A * | 10/2000 | Jones | G02B 6/02 385/123 |
| 6,282,354 | B1 * | 8/2001 | Jones | G02B 6/02 385/123 |
| 6,317,551 | B1 * | 11/2001 | Mitchell | G02B 6/02014 385/124 |
| 6,404,965 | B2 | 6/2002 | Jones | G02B 6/02 385/123 |
| 6,810,185 | B2 * | 10/2004 | Qi | G02B 6/02261 385/127 |
| 6,879,764 | B2 * | 4/2005 | Changdar | G02B 6/02242 385/123 |
| 7,024,083 | B2 * | 4/2006 | Bickham | G02B 6/02014 385/123 |
| 7,356,234 | B2 * | 4/2008 | de Montmorillon | G02B 6/02014 385/123 |
| 7,428,361 | B2 * | 9/2008 | Bigot-Astruc | G02B 6/02261 385/126 |
| 7,440,662 | B2 * | 10/2008 | Antona | G02B 6/02019 385/123 |
| 7,483,613 | B2 * | 1/2009 | Bigot-Astruc | H04B 10/25253 385/123 |
| 8,031,999 | B2 * | 10/2011 | Goto | G02B 6/02323 385/123 |
| 8,055,111 | B2 * | 11/2011 | Sillard | G02B 6/03661 385/123 |
| 8,676,015 | B2 * | 3/2014 | Sillard | G02B 6/02009 264/1.24 |
| 8,903,213 | B2 * | 12/2014 | Yamamoto | G02B 6/02 385/123 |
| 8,983,260 | B2 * | 3/2015 | Sillard | G02B 6/02019 264/1.24 |
| 2001/0046359 | A1 * | 11/2001 | Jones | G02B 6/02 385/124 |
| 2002/0141719 | A1 * | 10/2002 | Liu | G02B 6/02014 385/127 |
| 2003/0063878 | A1 * | 4/2003 | Matsuo | C03B 37/01228 385/123 |
| 2003/0142940 | A1 * | 7/2003 | Qi | G02B 6/02261 385/127 |
| 2004/0197063 | A1 * | 10/2004 | Changdar | G02B 6/02242 385/127 |
| 2005/0185906 | A1 * | 8/2005 | Bickham | G02B 6/02014 385/124 |
| 2007/0003200 | A1 * | 1/2007 | Collaro | C03B 37/0253 385/127 |
| 2007/0065081 | A1 * | 3/2007 | Antona | G02B 6/02019 385/123 |
| 2007/0140635 | A1 * | 6/2007 | Bigot-Astruc | G02B 6/02261 385/126 |
| 2007/0258686 | A1 * | 11/2007 | De Montmorillon | G02B 6/02014 385/127 |
| 2008/0107426 | A1 * | 5/2008 | Bigot-Astruc | H04B 10/25253 398/159 |
| 2009/0252469 | A1 * | 10/2009 | Sillard | G02B 6/03661 385/127 |
| 2009/0324186 | A1 * | 12/2009 | Goto | G02B 6/02323 385/127 |
| 2011/0188823 | A1 * | 8/2011 | Sillard | G02B 6/02009 385/123 |
| 2011/0188826 | A1 * | 8/2011 | Sillard | G02B 6/02019 385/127 |

FOREIGN PATENT DOCUMENTS

| | | |
|---|---|---|
| JP | 2006-512266 A | 4/2006 |
| JP | 4393708 B2 | 1/2010 |
| JP | 2013-178335 A | 9/2013 |
| WO | 00/19255 A2 | 4/2000 |
| WO | 01/38911 A1 | 5/2001 |
| WO | 2004/059355 A1 | 7/2004 |

* cited by examiner

RELATIVE REFRACTIVE INDEX DIFFERENCE

DISPERSION SHIFTED OPTICAL FIBER

TECHNICAL FIELD

The present invention relates to a dispersion shifted optical fiber suited to the case of reducing the variation of a bending loss of light propagating through a core.

BACKGROUND

In the transmission networks of optical communications, single-mode optical fibers are used. As optical communications using the single-mode optical fiber, wavelength division multiplexing transmission (WDM transmission) is widely accepted. Wavelength division multiplexing transmission is a method of transmitting a plurality of optical signals using a plurality of wavelengths, not one wavelength, for optical communications, which is an optical transmission method suited to large-capacity high-speed communications.

In wavelength division multiplexing transmission, in order to reduce wavelength dispersion, a dispersion shifted optical fiber is sometimes used. Among others, a non-zero dispersion-shifted fiber (NZDSF) is sometimes used, in which dispersion caused by wavelengths of light is reduced as well as the dispersion is not zero.

Patent Literature 1 below describes a dispersion shifted optical fiber. The dispersion shifted optical fiber described in Patent Literature 1 below includes a core having three segments.

[Patent Literature 1] JP4393708 B2

SUMMARY

However, in the dispersion shifted optical fiber described in Patent Literature 1 above, it is revealed that a so-called bending loss, which is an optical loss of light propagating through the dispersion shifted optical fiber when bending the fiber, easily fluctuates in the case in which the ratio between the cladding diameter and the core diameter is changed. A typical optical fiber preform is prepared using a core-clad rod formed of a rod-like core glass body to be a core and an inner cladding glass body that surrounds the outer circumferential surface of this core glass body and is to be the inner portion of a cladding. Using a sleeving method or an outside vapor deposition (OVD) method, the outer circumferential surface of the core-clad rod (the outer circumferential surface of the inner cladding glass body) is covered with an outer cladding glass body to be the outer portion of the cladding. Typically, the outer cladding glass body is often prepared inexpensively. Thus, the outer diameter of the outer cladding glass body easily fluctuates. This fluctuation of the outer diameter of the outer cladding glass body leads to the fluctuation of the outer diameter of the optical fiber preform. On the other hand, the cladding diameter of an optical fiber, which is formed by drawing an optical fiber preform, is constant at a diameter of 125 µm, for example. Thus, when the outer diameter of the optical fiber preform fluctuates, the ratio between the cladding diameter and the core diameter is changed. There is a concern that the ratio between the core diameter and the cladding diameter is changed due to errors in manufacture as described above, causing an increase in the variation of a bending loss of light propagating through the dispersion shifted optical fiber to be manufactured. The optical fiber is sometimes linearly constructed as well as the optical fiber is sometimes constructed being bent. Hence, it may be undesirable to vary a bending loss of propagating light as described above.

Therefore, one or more embodiments of the present invention provide a dispersion shifted optical fiber that can reduce a change in a bending loss even in the case in which the ratio between the core diameter and the cladding diameter is changed.

Additionally, one or more embodiments of the present invention provide a dispersion shifted optical fiber in which a dispersion value of a light beam at a wavelength in a range of 1,530 to 1,625 nm is 2.0 ps/nm/km or more and 13.5 ps/nm/km or less, a dispersion slope of a light beam at a wavelength of 1,550 nm is 0.092 ps/nm$^2$/km or less, a cable cutoff wavelength is a wavelength of 1,450 nm or less, an effective area of a light beam at a wavelength of 1,550 nm is 65 µm$^2$ or more and 90 µm$^2$ or less, and a mode field diameter of a light beam at a wavelength of 1,550 nm is 9.2 µm or more and 10.5 µm or less. The dispersion shifted optical fiber has the following characteristics.

A core includes a first segment including a center axis of the core, a second segment that surrounds an outer circumferential surface of the first segment with no gap, a third segment that surrounds an outer circumferential surface of the second segment with no gap, and a fourth segment that surrounds an outer circumferential surface of the third segment with no gap. The first segment includes a first center segment including the center axis.

Moreover, a radius $r_0$ of the first center segment is 0.5 µm or more and 2.8 µm or less, a radius $r_1$ of the first segment is 1.8 µm or more and 4.5 µm or less, a radius $r_2$ of the second segment is 4.0 µm or more and 8.0 µm or less, a radius $r_3$ of the third segment is 4.5 µm or more and 8.5 µm or less, a radius $r_4$ of the fourth segment is 8.0 µm or more and 16.0 µm or less, and a relation $r_0 \leq r_1 < r_2 < r_3 < r_4$ is held.

Moreover, a relative refractive index difference $\Delta_0$ of the first center segment to a cladding surrounding the core is 0.4% or more and 0.9% or less, a relative refractive index difference $\Delta_2$ of the second segment to the cladding is 0.00% or more and 0.07% or less, a relative refractive index difference $\Delta_3$ of the third segment to the cladding is 0.285% or more and 0.5% or less, and a relative refractive index difference $\Delta_4$ of the fourth segment to the cladding is 0.005% or more and 0.04% or less. In the first segment, a relative refractive index difference to the cladding is reduced from an outer circumference of the first center segment to an inner circumference of the second segment.

As a result of dedicated investigation, the present inventors found that the dispersion shifted optical fiber having the characteristics above, i.e., the dispersion shifted optical fiber that transmits light in the C band and the L band has a bending loss of light propagating through the core, which is not easily changed, even in the case in which the ratio between the core diameter and the cladding diameter is changed. Hence, according to one or more embodiments of the present invention, the variation of the characteristics can be reduced, even in the case in which the refractive index of the cladding fluctuates due to manufacture.

The dispersion shifted optical fiber above may be configured in which the radius $r_0$ of the first center segment is matched with the radius $r_1$ of the first segment. In this case, the radius $r_0$ of the first center segment is 1.8 µm or more, the radius $r_i$ of the first segment is 2.8 µm or less, the radius $r_2$ of the second segment is 5.0 µm or more and 6.6 µm or less, the radius $r_3$ of the third segment is 6.1 µm or more, the relative refractive index difference $\Delta_0$ of the first center segment to the cladding is 0.8% or less, and the relative refractive index difference $\Delta_2$ of the second segment to the cladding is 0.06% or less.

Since the radius $r_0$ of the first center segment is matched with the radius $r_1$ of the first segment, the first segment is substantially configured of the first center segment. In other words, the first segment has a step refractive index profile. The relative refractive index difference to the cladding is the relative refractive index difference $\Delta_0$ of the first center segment. Thus, the first segment has a step refractive index profile. Consequently, the dispersion shifted optical fiber is more easily manufactured than in the case in which the refractive index is changed in the first segment.

As described above, in the case in which the first segment has a step refractive index profile, the radius $r_0$ of the first center segment is 2.0 μm or more and 2.6 μm or less, the radius $r_2$ of the second segment is 6.0 μm or less, the radius $r_3$ of the third segment is 7.5 μm or less, and the radius $r_4$ of fourth segment is 11.0 μm or more and 15.0 μm or less, and the relative refractive index difference $\Delta_0$ of the first center segment to the cladding is 0.47% or more and 0.67% or less, the relative refractive index difference $\Delta_2$ of the second segment to the cladding is 0.02% or more, the relative refractive index difference $\Delta_3$ of the third segment to the cladding is 0.35% or less, and the relative refractive index difference $\Delta_4$ of the fourth segment to the cladding is 0.010% or more and 0.025% or less.

Such a refractive index profile is provided. Consequently, a change in a bending loss of light propagating through the core can be further reduced, even in the case in which the ratio between the core diameter and the cladding diameter is changed.

Alternatively, the dispersion shifted optical fiber above may be configured in which the radius $r_0$ of the first center segment is smaller than the radius $r_1$ of the first segment. In this case, the radius $r_0$ of the first center segment is 1.3 μm or less, the radius $r_1$ of the first segment is 2.0 μm or more, the radius $r_2$ of the second segment is 5.0 μm or more, the radius $r_3$ of the third segment is 6.0 μm or more, the radius $r_4$ of the fourth segment is 9.0 μm or more, and the relative refractive index difference $\Delta_0$ of the first center segment to the cladding is 0.5% or more.

As described above, the relative refractive index difference to the cladding is reduced from the outer circumference of the first center segment to the inner circumference of the second segment in the first segment. Thus, a configuration is provided in which the radius $r_0$ of the first center segment is smaller than the radius $r_1$ of the first segment, and hence the first segment has a refractive index profile generally in a trapezoid shape. Consequently, the first segment has a refractive index profile generally in a trapezoid shape, allowing the difference in viscosity to be gradually changed in the portion from the outer circumference of the first center segment to the second segment in the first segment. Accordingly, a large residual stress, can be decreased, and an increase in transmission losses can be reduced.

As described above, in the case in which the first segment has a refractive index profile in a trapezoid shape, the radius $r_0$ of the first center segment is 0.5 μm or more and 1.0 μm or less, the radius $r_1$ of the first segment is 3.0 μm or more and 4.5 μm or less, the radius $r_2$ of the second segment is 5.2 μm or more and 6.5 μm or less, the radius $r_3$ of the third segment is 6.5 μm or more and 8.0 μm or less, and the radius $r_4$ of the fourth segment is 10.0 μm or more and 13.5 μm or less, and the relative refractive index difference $\Delta_0$ of the cladding surrounding the core of the first center segment is 0.6% or more and 0.8% or less, the relative refractive index difference $\Delta_2$ of the second segment to the cladding is 0.020% or more and 0.065% or less, the relative refractive index difference $\Delta_3$ of the third segment to the cladding is 0.4% or less, and the relative refractive index difference $\Delta_4$ of the fourth segment to the cladding is 0.01% or more and 0.03% or less.

Such a refractive index profile is provided. Hence, a change in a bending loss of light propagating through the core can be further reduced, even in the case in which the ratio between the core diameter and the cladding diameter is changed.

As described above, according to one or more embodiments of the present invention, there is provided a dispersion shifted optical fiber that can reduce a bending loss of propagating light even in the case in which the refractive index of the cladding fluctuates due to manufacture.

DETAILED DESCRIPTION

In the following, one or more embodiments of a dispersion shifted optical fiber will be described in detail with reference to the drawings.

Figure 1:
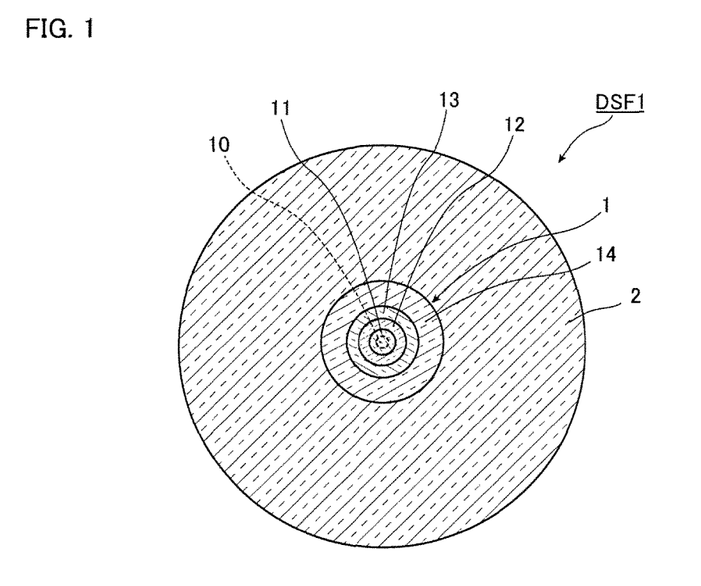
FIG. 1 is a diagram of a structure in a cross section perpendicular to the longitudinal direction of a dispersion shifted optical fiber according to one or more embodiments of the present invention.

FIG. 1 is a diagram of a structure in a cross section perpendicular to the longitudinal direction of a dispersion shifted optical fiber.

In a dispersion shifted optical fiber DSF1, a dispersion value of a light beam at a wavelength in a range of 1,530 to 1,625 nm is 2.0 ps/nm/km or more and 13.5 ps/nm/km or less, a dispersion slope of a light beam at a wavelength of 1,550 nm is 0.092 ps/nm$^2$/km or less, a cable cutoff wavelength is a wavelength of 1,450 nm or less, an effective area of a light beam at a wavelength of 1,550 nm is 65 μm$^2$ or more and 90 μm$^2$ or less, and a mode field diameter of a light beam at a wavelength of 1,550 nm is 9.2 μm or more and 10.5 μm or less. In other words, the dispersion shifted optical fiber DSF1 is a dispersion shifted optical fiber that transmits light in the C band and the L band.

As illustrated in FIG. 1, the dispersion shifted optical fiber DSF1 includes a core 1 and a cladding 2 that surrounds the outer circumferential surface of the core 1 with no gap.

The core 1 includes a first segment 11, a second segment 12 that surrounds the outer circumferential surface of the first segment 11 with no gap, a third segment 13 that surrounds the outer circumferential surface of the second segment 12 with no gap, and a fourth segment 14 that surrounds the outer circumferential surface of the third segment 13 with no gap. As depicted by a broken line in FIG. 1, the first segment 11 includes a first center segment 10 including the center axis of the core 1. Thus, the dispersion shifted optical fiber DSF1 has four segments.

A radius $r_0$ of the first center segment 10 is 0.5 μm or more and 2.8 μm or less. A radius $r_1$ of the first segment 11 is 1.8 μm or more and 4.5 μm or less. A radius $r_2$ of the second segment 12 is 4.0 µm or more and 8.0 µm or less. A radius $r_3$ of the third segment 13 is 4.5 µm or more and 8.5 µm or less. A radius $r_4$ of the fourth segment 14 is 8.0 µm or more and 16.0 µm or less. Note that, the radius of each segment means the radius of the outer circumferential surface of each segment.

Among the radius $r_0$ of the first center segment 10, the radius $r_1$ of the first segment 11, the radius $r_2$ of the second segment 12, the radius $r_3$ of the third segment 13, and the radius $r_4$ of the fourth segment 14, a relation below is held.

$$r_0 < r_1 < r_2 < r_3 < r_4$$

Figure 2:
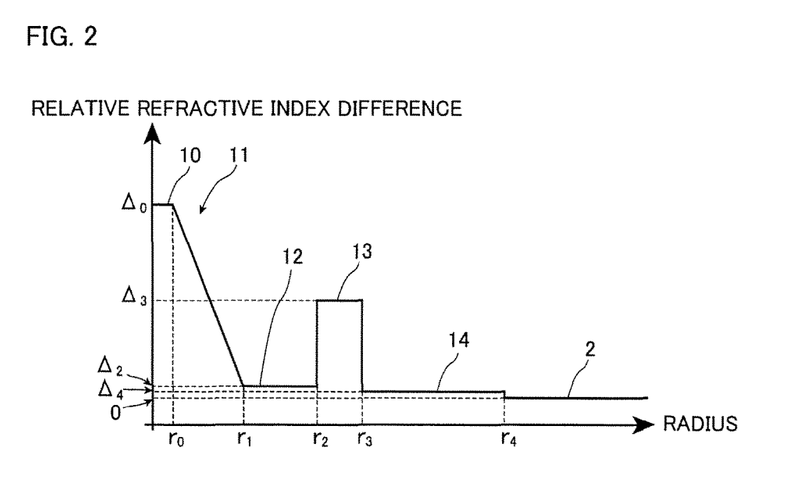
FIG. 2 is a diagram of a relative refractive index profile of the dispersion shifted optical fiber in FIG. 1 to a cladding.

FIG. 2 is a diagram of the profile of the relative refractive index difference to the cladding 2 in the radial direction of the dispersion shifted optical fiber DSF1 in FIG. 1. However, FIG. 2 shows the refractive index profile only on one side of the radial direction from the center axis of the dispersion shifted optical fiber DSF1. A relative refractive index difference $\Delta_0$ of the first center segment 10 to the cladding 2 is 0.4% or more and 0.9% or less. A relative refractive index difference $\Delta_2$ of the second segment 12 to the cladding 2 is 0.00% or more and 0.07% or less. Thus, the relative refractive index difference $\Delta_2$ of the second segment 12 to the cladding 2 is smaller than the relative refractive index difference $\Delta_0$ of the first center segment 10 to the cladding 2. In the first segment 11, the relative refractive index difference to the cladding 2 is reduced from the outer circumference of the first center segment 10 to the inner circumference of the second segment 12. A relative refractive index difference $\Delta_3$ of the third segment 13l to the cladding 2 is 0.285% or more and 0.5% or less. A relative refractive index difference $\Delta_4$ of the fourth segment 14 to the cladding 2 is 0.005% or more and 0.04% or less.

Materials configuring the core 1 and the cladding 2 of the dispersion shifted optical fiber DSF1 are materials below. For example, the cladding 2 is formed of pure silica. The first segment 11 and the third segment 13 of the core 1 are formed of silica doped with a dopant that increases the refractive index. The second segment 12 and the fourth segment 14 are formed of silica appropriately doped with a dopant that increases the refractive index or a dopant that decreases the refractive index. A representative dopant that acts to increase the refractive index can be germanium (Ge). Germanium is doped as $GeO_2$. A representative dopant that acts to decrease the refractive index can be fluorine (F). Note that, dopants added to the segments of the core 1 are at least one kind or two kinds selected from germanium, aluminum (Al), phosphorus (P), and fluorine. Types and loadings of dopants are appropriately selected so that the relative refractive index differences to the cladding 2 are in the ranges described above.

The segments of the core 1 have the radii and the relative refractive index differences to the cladding 2 described above. Hence, the dispersion shifted optical fiber DSF1 has the dispersion value, the dispersion slope, the cable cutoff wavelength, the effective area, and the mode field diameter as described above.

As described above, the segments of the core 1 have the radii and the relative refractive index differences to the cladding 2 described above. Hence, the dispersion shifted optical fiber DSF1 can reduce a change in a bending loss of light propagating through the core 1, even in the case in which the ratio between the diameter (the core diameter) of the core 1 and the diameter (the cladding diameter) of the cladding 2 is changed.

Note that, as described above, the dispersion shifted optical fiber DSF1 has a relation $r_0 < r_1$. In the first segment 11, the relative refractive index difference to the cladding 2 is reduced from the outer circumference of the first center segment 10 to the inner circumference of the second segment 12. Hence, in $r_0 < r_1$, the shape of the refractive index profile of the first segment 11 is generally in a trapezoid.

Thus, in the case in which the shape of the refractive index profile of the first segment 11 is generally in a trapezoid, the segments may have the radii and the relative refractive index differences to the cladding 2 in ranges below.

In other words, the radius $r_0$ of the first center segment 10 is 0.5 µm or more and 1.3 µm or less, the radius $r_1$ of the first segment 11 is 2.0 µm or more and 4.5 µm or less, the radius $r_2$ of the second segment 12 is 5.0 µm or more and 8.0 µm or less, the radius $r_3$ of the third segment 13 is 6.0 µm or more and 8.5 µm or less, and the radius $r_4$ of the fourth segment 14 is 9.0 µm or more and 16.0 µm or less. However, as described above, the relation $r_1 < r_2 < r_3 < r_4$ is held.

The relative refractive index difference $\Delta_0$ of the first center segment 10 to the cladding 2 is 0.5% or more and 0.9% or less, the relative refractive index difference $\Delta_2$ of the second segment 12 to the cladding 2 is 0.00% or more and 0.07% or less, the relative refractive index difference $\Delta_3$ of the third segment 13 to the cladding 2 is 0.285% or more and 0.5% or less, and the relative refractive index difference $\Delta_4$ of the fourth segment 14 to the cladding 2 is 0.005% or more and 0.04% or less.

In the case in which the first segment 11 has a refractive index profile generally in a trapezoid shape, the segments of the core 1 have the radii and the relative refractive index differences to the cladding 2 described above. Hence, the difference in viscosity can be gradually changed in the portion from the outer circumference of the first center segment 10 to the second segment 12 in the first segment 11. Consequently, a large residual stress can be decreased, and an increase in transmission losses can be reduced.

Thus, in the case in which the shape of the refractive index profile of the first segment 11 is generally in a trapezoid, the segments may have the radii and the relative refractive index differences to the cladding 2 in ranges below.

In other words, the radius $r_0$ of the first center segment 10 is 0.5 µm or more and 1.0 µm or less, the radius $r_1$ of the first segment 11 is 3.0 µm or more and 4.5 µm or less, the radius $r_2$ of the second segment 12 is 5.2 µm or more and 6.5 µm or less, the radius $r_3$ of the third segment 13 is 6.5 µm or more and 8.0 µm or less, and the radius $r_4$ of the fourth segment 14 is 10.0 µm or more and 13.5 µm or less. However, as described above, the relation $r_1 < r_2 < r_3 < r_4$ is held.

The relative refractive index difference $\Delta_0$ of the first center segment 10 to the cladding 2 is 0.6% or more and 0.8% or less, the relative refractive index difference $\Delta_2$ of the second segment 12 to the cladding 2 is 0.02% or more and 0.065% or less, the relative refractive index difference $\Delta_3$ of the third segment 13 to the cladding 2 is 0.285% or more and 0.4% or less, and the relative refractive index difference $\Delta_4$ of the fourth segment 14 to the cladding 2 is 0.01% or more and 0.03% or less.

The segments of the core 1 have the radii and the relative refractive index differences to the cladding 2 described above. Thus, a change in a bending loss of light propagating through the core 1 can be further reduced, even in the case in which the ratio between the diameter of the core 1 and the diameter of the cladding 2 is changed.

Next, referring to FIGS. 3 and 4, a dispersion shifted optical fiber according to one or more embodiments the present invention will be described in detail. Note that, components the same as or equivalent to the components of the dispersion shifted optical fiber DSF1 are designated the same reference numerals and signs unless otherwise specified, and the overlapping description is omitted.

Figure 3:
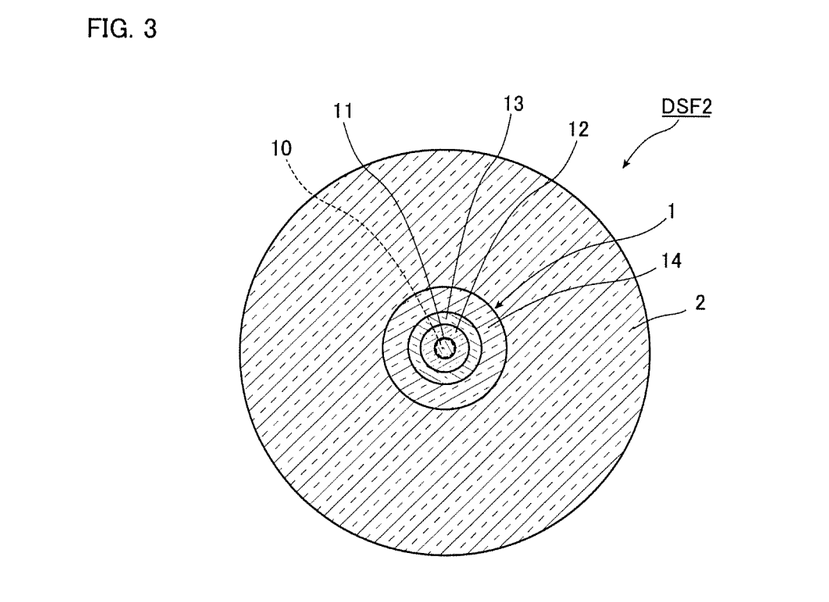
FIG. 3 is a diagram of a dispersion shifted optical fiber according to one or more embodiments of the present invention.

FIG. 3 is a diagram of a structure in a cross section perpendicular to the longitudinal direction of the dispersion shifted optical fiber.

Also, in a dispersion shifted optical fiber DSF2, a dispersion value of a light beam at a wavelength in a range of 1,530 to 1,625 nm is 2.0 ps/nm/km or more and 13.5 ps/nm/km or less, a dispersion slope of a light beam at a wavelength of 1,550 nm is 0.092 ps/nm$^2$/km or less, a cable cutoff wavelength is a wavelength of 1,450 nm or less, an effective area of a light beam at a wavelength of 1,550 nm is 65 μm$^2$ or more and 90 μm$^2$ or less, and a mode field diameter of a light beam at a wavelength of 1,550 nm is 9.2 μm or more and 10.5 μm or less. In other words, similarly to the dispersion shifted optical fiber DSF1, the dispersion shifted optical fiber DSF2 is a dispersion shifted optical fiber that transmits light in the C band and the L band.

The dispersion shifted optical fiber DSF2 has four segments. However, the dispersion shifted optical fiber DSF2 is different from the dispersion shifted optical fiber DSF1 in a relation $r_0 = r_1$.

In the dispersion shifted optical fiber, a radius $r_0$ of a first center segment 10 is equal to a radius $r_1$ of a first segment 11. The radii are 1.8 μm or more and 2.8 μm or less.

Figure 4:
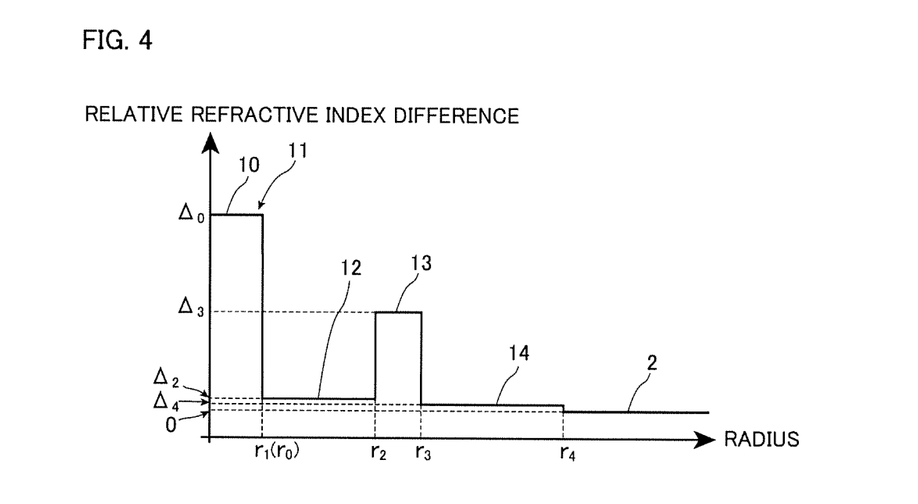
FIG. 4 is a diagram of a relative refractive index profile of the dispersion shifted optical fiber in FIG. 3 to a cladding.

FIG. 4 is a diagram of the relative refractive index profile of the dispersion shifted optical fiber DSF2 in FIG. 3 in a manner similar to FIG. 2. Similarly, the relative refractive index difference to a cladding 2 is reduced from the outer circumference of the first center segment 10 to the inner circumference of a second segment 12 in the first segment 11. However, as illustrated in FIG. 4, in order to hold the relation $r_0 = r_1$, the outer circumference of the first center segment 10 is matched with the inner circumference of the second segment 12 (the outer circumference of the first segment 11). As illustrated in FIG. 4, the shape of the refractive index profile of the first segment 11 is generally a step-index shape.

Thus, in the case in which the shape of the refractive index profile of the first segment 11 is generally in a step-index shape, the segments may have the radii and the relative refractive index differences to the cladding 2 in ranges below.

In other words, the radius $r_0$ of the first center segment 10 (the radius $r_1$ of the first segment 11) is 1.8 μm or more and 2.8 μm or less, a radius $r_2$ of the second segment 12 is 5.0 μm or more and 6.6 μm or less, a radius $r_3$ of a third segment 13 is 6.1 μm or more and 8.5 μm or less, and a radius $r_4$ of a fourth segment 14 is 8.0 μm or more and 16.0 μm or less. However, as described above, a relation $r_0$ ($r_1$)<$r_2$<$r_3$<$r_4$ is held.

A relative refractive index difference $\Delta_0$ of the first center segment 10 to the cladding 2 (a relative refractive index difference $\Delta_1$ of the first segment 11 to the cladding 2) is 0.4% or more and 0.8% or less, a relative refractive index difference $\Delta_2$ of the second segment 12 to the cladding 2 is 0.00% or more and 0.06% or less, a relative refractive index difference $\Delta_3$ of the third segment 13 to the cladding 2 is 0.285% or more and 0.5% or less, and a relative refractive index difference $\Delta_4$ of the fourth segment 14 to the cladding 2 is 0.005% or more and 0.04% or less.

In the case in which the first segment has a refractive index profile generally in a trapezoid shape, the segments of the core 1 have the radii and the relative refractive index differences to the cladding 2 described above. Hence, the dispersion shifted optical fiber is more easily manufactured than in the case in which the refractive index is changed in the first segment 11.

Thus, in the case in which the shape of the refractive index profile of the first segment 11 is generally in a step-index shape, the segments may have the radii and the relative refractive index differences to the cladding 2 in ranges below.

In other words, the radius $r_0$ of the first center segment 10 (the radius $r_1$ of the first segment 11) is 2.0 μm or more and 2.6 μm or less, the radius $r_2$ of the second segment 12 is 5.0 μm or more and 6.0 μm or less, the radius $r_3$ of the third segment 13 is 6.1 μm or more and 7.5 μm or less, and the radius $r_4$ of the fourth segment 14 is 11.0 μm or more and 15.0 μm or less. However, as described above, the relation $r_1$ ($r_1$)<$r_2$<$r_3$<$r_4$ is held.

The relative refractive index difference $\Delta_0$ of the first center segment 10 to the cladding 2 (the relative refractive index difference $\Delta_1$ of the first segment 11 to the cladding 2) is 0.47% or more and 0.67% or less, the relative refractive index difference $\Delta_2$ of the second segment 12 to the cladding 2 is 0.02% or more and 0.06% or less, the relative refractive index difference $\Delta_3$ of the third segment 13 to the cladding 2 is 0.285% or more and 0.35% or less, and the relative refractive index difference $\Delta_4$ of the fourth segment 14 to the cladding 2 is 0.010% or more and 0.025% or less.

The segments of the core 1 have the radii and the relative refractive index differences to the cladding 2 described above. Thus, a change in a bending loss of light propagating through the core 1 can be further reduced, even in the case in which the ratio between the diameter of the core 1 and the diameter of the cladding 2 is changed.

As described above, one or more embodiments of the present invention are described and are taken as examples. However, the present invention is not limited to these embodiments.

For example, in one or more embodiments, the relative refractive index to the cladding 2 is decreased from the outer circumferential surface of the first center segment 10 to the inner circumference of the second segment 12 in the first segment 11. However, the relative refractive index to the cladding 2 only has to be decreased from the outer circumferential surface of the first center segment 10 to the inner circumference of the second segment 12 in the first segment 11. The relative refractive index to the cladding 2 may be decreased in a step-index shape.

EXAMPLES

In the following, the content according to one or more embodiments of the present invention will be described more in detail using examples and comparative examples. However, the present invention is not limited to these examples and comparative examples.

Example 1

Simulation was conducted using the dispersion shifted optical fiber DSF1 illustrated in FIGS. 1 and 2 as a model. The radius $r_0$ of the first center segment 10 of the first segment 11, the radius $r_1$ of the first segment 11, the radius $r_2$ of the second segment 12, the radius $r_3$ of the third segment 13, and the radius $r_4$ of the fourth segment 14 were set as shown in Table 1. The relative refractive index difference $\Delta_0$ of the first center segment 10 to the cladding 2, the relative refractive index difference $\Delta_2$ of the second segment 12 to the cladding 2, the relative refractive index difference $\Delta_3$ of the third segment 13 to the cladding 2, and the relative refractive index difference $\Delta_4$ of the fourth segment 14 to the cladding 2 were set as shown in Table 1. The dispersion shifted optical fiber DSF1 was configured in which the relative refractive index difference to the cladding 2 was decreased in a slope from the outer circumferential surface of the first center segment 10 to the inner circumference of the second segment 12 in the first segment 11.

In the dispersion shifted optical fiber DSF1 having the radii of the segments and the relative refractive index differences of the segments to the cladding 2 as described above, the cutoff wavelength ($\lambda c$) of the dispersion shifted optical fiber DSF1, the effective area (Aeff) in the case in which a light beam at a wavelength of 1,550 nm propagates, the mode field diameter (MFD) in the case in which a light beam at a wavelength of 1,550 nm propagates, the dispersion value (Disp) of a light beam at a wavelength of 1,550 nm, the dispersion slope (Slope) of a light beam at a wavelength of 1,550 nm, the bending loss (Bloss) of a light beam at a wavelength of 1,550 nm propagating through the dispersion shifted optical fiber DSF1 bent at a diameter of 20 mm, and the loss (Loss) of a light beam at a wavelength of 1,550 nm propagating through the dispersion shifted optical fiber DSF1 linearly constructed were as shown in Table 2.

The variability rate of the bending loss (Bloss VR) in the case in which the ratio between the diameter of the core 1 and the diameter of the cladding 2 fluctuates by 1% was as shown in Table 2.

Examples 2 to 11

Other than the radius ($r_0$, $r_1$, $r_2$, $r_3$, and $r_4$) of the segments and the relative refractive index differences ($\Delta_0$, $\Delta_2$, $\Delta_3$, and $\Delta_4$) of the segments to the cladding 2 were set as shown in Table 1, simulation of the dispersion shifted optical fiber DSF1 was conducted similarly to example 1.

The cutoff wavelength (Xc) of the dispersion shifted optical fiber DSF1 in this case, the effective area (Aeff) in the case in which a light beam at a wavelength of 1,550 nm propagates, the mode field diameter (MFD) in the case in which a light beam at a wavelength of 1,550 nm propagates, the dispersion value (Disp) of a light beam at a wavelength of 1,550 nm, the dispersion slope (Slope) of a light beam at a wavelength of 1,550 nm, the bending loss (Bloss) of a light beam at a wavelength of 1,550 nm propagating through the dispersion shifted optical fiber DSF1 bent at a diameter of 20 mm, and the loss (Loss) of a light beam at a wavelength of 1,550 nm propagating through the dispersion shifted optical fiber DSF1 linearly constructed were as shown in Table 2.

The variability rate of the bending loss (Bloss VR) in the case in which the ratio between the diameter of the core 1 and the diameter of the cladding 2 fluctuates by 1% was as shown in Table 2.

Example 12

Simulation was conducted using the dispersion shifted optical fiber DSF2 illustrated in FIGS. 3 and 4 as a model. Thus, the radius $r_0$ of the first center segment 10 is equal to the radius $r_1$ of the first segment 11. The radius $r_0$ of the first center segment 10 of the first segment 11 (the radius $r_1$ of the first segment 11), the radius $r_2$ of the second segment 12, the radius $r_3$ of the third segment 13, and the radius $r_4$ of the fourth segment 14 were set as shown in Table 1. The relative refractive index difference $\Delta_0$ of the first center segment 101 to the cladding 2, the relative refractive index difference $\Delta_2$ of the second segment 12 to the cladding 2, the relative refractive index difference $\Delta_3$ of the third segment 13 to the cladding 2, and the relative refractive index difference $\Delta_4$ of the fourth segment 14 to the cladding 2 were set as shown in Table 1.

Thus, in the dispersion shifted optical fiber DSF2 having the radii of the segments and the relative refractive index differences of the segments to the cladding 2 as described above, the cutoff wavelength ($\lambda c$) of the dispersion shifted optical fiber DSF2, the effective area (Aeff) in the case in which a light beam at a wavelength of 1,550 nm propagates, the mode field diameter (MFD) in the case in which a light beam at a wavelength of 1,550 nm propagates, the dispersion value (Disp) of a light beam at a wavelength of 1,550 nm, the dispersion slope (Slope) of a light beam at a wavelength of 1,550 nm, the bending loss (Bloss) of a light beam at a wavelength of 1,550 nm propagating through the dispersion shifted optical fiber DSF2 bent at a diameter of 20 mm, and the loss (Loss) of a light beam at a wavelength of 1,550 nm propagating through the dispersion shifted optical fiber DSF2 linearly constructed were as shown in Table 2.

The variability rate of the bending loss (Bloss VR) in the case in which the ratio between the diameter of the core 1 and the diameter of the cladding 2 fluctuates by 1% was as shown in Table 2.

Examples 13 to 18

Other than the radius ($r_0$ ($r_1$), $r_2$, $r_3$, $r_4$) of the segments and the relative refractive index differences ($\Delta_0$ ($\Delta_1$), $\Delta_2$, $\Delta_3$, and $\Delta_4$) of the segments to the cladding 2 were set as shown in Table 1, simulation of the dispersion shifted optical fiber DSF2 was conducted similarly to example 4.

The cutoff wavelength ($\lambda c$) of the dispersion shifted optical fiber DSF2 in this case, the effective area (Aeff) in the case in which a light beam at a wavelength of 1,550 nm propagates, the mode field diameter (MFD) in the case in which a light beam at a wavelength of 1,550 nm propagates, the dispersion value (Disp) of a light beam at a wavelength of 1,550 nm, the dispersion slope (Slope) of a light beam at a wavelength of 1,550 nm, the bending loss (Bloss) of a light beam at a wavelength of 1,550 nm propagating through the dispersion shifted optical fiber DSF2 bent at a diameter of 20 mm, and the loss (Loss) of a light beam at a wavelength of 1,550 nm propagating through the dispersion shifted optical fiber DSF2 linearly constructed were as shown in Table 2.

The variability rate of the bending loss (Bloss VR) in the case in which the ratio between the diameter of the core 1 and the diameter of the cladding 2 fluctuates by 1% was as shown in Table 2.

Comparative Example 1

Other than a dispersion shifted optical fiber having three segments was formed, from which the fourth segment 14 of the dispersion shifted optical fiber DSF1 shown in FIGS. 1 and 2 was removed, and the radius ($r_0$, $r_1$, $r_2$, and $r_3$) of segments and the relative refractive index differences ($\Delta_0$, $\Delta_2$, and $\Delta_3$) of the segments to a cladding 2 were set as shown in Table 1, simulation of the dispersion shifted optical fiber was conducted similarly to example 1.

The cutoff wavelength ($\lambda c$) of the dispersion shifted optical fiber in this case, the effective area (Aeff) in the case in which a light beam at a wavelength of 1,550 nm propagates, the mode field diameter (MFD) in the case in which a light beam at a wavelength of 1,550 nm propagates, the dispersion value (Disp) of a light beam at a wavelength of 1,550 nm, the dispersion slope (Slope) of a light beam at a wavelength of 1,550 nm, the bending loss (Bloss) of a light beam at a wavelength of 1,550 nm propagating through the dispersion shifted optical fiber bent at a diameter of 20 mm, and the loss (Loss) of a light beam at a wavelength of 1,550 nm propagating through the dispersion shifted optical fiber linearly constructed were as shown in Table 2.

The variability rate of the bending loss (Bloss VR) in the case in which the ratio between the diameter of the core 1 and the diameter of the cladding 2 fluctuates by 1% was as shown in Table 2.

Comparative Example 2

Other than a dispersion shifted optical fiber having three segments was formed, from which the fourth segment 14 of the dispersion shifted optical fiber DSF2 illustrated in FIGS. 3 and 4 was removed, and the radius ($r_0$, $r_1$, $r_2$, and $r_3$) of segments and the relative refractive index differences ($\Delta_0$, $\Delta_2$, and $\Delta_3$) of the segments to a cladding 2 were set as shown in Table 1, simulation of the dispersion shifted optical fiber was conducted similarly to example 4.

The cutoff wavelength ($\lambda c$) of the dispersion shifted optical fiber in this case, the effective area (Aeff) in the case in which a light beam at a wavelength of 1,550 nm propagates, the mode field diameter (MFD) in the case in which a light beam at a wavelength of 1,550 nm propagates, the dispersion value (Disp) of a light beam at a wavelength of 1,550 nm, the dispersion slope (Slope) of a light beam at a wavelength of 1,550 nm, the bending loss (Bloss) of a light beam at a wavelength of 1,550 nm propagating through the dispersion shifted optical fiber bent at a diameter of 20 mm, and the loss (Loss) of a light beam at a wavelength of 1,550 nm propagating through the dispersion shifted optical fiber linearly constructed were as shown in Table 2.

The variability rate of the bending loss (Bloss VR) in the case in which the ratio between the diameter of the core 1 and the diameter of the cladding 2 fluctuates by 1% was as shown in Table 2.

Comparative Example 3

Other than the radius ($r_0$, $r_1$, $r_2$, $r_3$, and $r_4$) of the segments and the relative refractive index differences ($\Delta_0$, $\Delta_2$, $\Delta_3$, and $\Delta_4$) of the segments to the cladding 2 were set as shown in Table 1, simulation of the dispersion shifted optical fiber DSF1 was conducted similarly to example 1.

The cutoff wavelength ($\lambda c$) of the dispersion shifted optical fiber DSF1 in this case, the effective area (Aeff) in the case in which a light beam at a wavelength of 1,550 nm propagates, the mode field diameter (MFD) in the case in which a light beam at a wavelength of 1,550 nm propagates, the dispersion value (Disp) of a light beam at a wavelength of 1,550 nm, the dispersion slope (Slope) of a light beam at a wavelength of 1,550 nm, the bending loss (Bloss) of a light beam at a wavelength of 1,550 nm propagating through the dispersion shifted optical fiber DSF1 bent at a diameter of 20 mm, and the loss (Loss) of a light beam at a wavelength of 1,550 nm propagating through the dispersion shifted optical fiber DSF1 linearly constructed were as shown in Table 2.

The variability rate of the bending loss (Bloss VR) in the case in which the ratio between the diameter of the core 1 and the diameter of the cladding 2 fluctuates by 1% was as shown in Table 2.

Comparative Examples 4 to 6

Other than the radius ($r_0$ ($r_1$), $r_2$, $r_3$, $r_4$) of the segments and the relative refractive index differences ($\Delta_0$ ($\Delta_1$), $\Delta_2$, $\Delta_3$, and $\Delta_4$) of the segments to the cladding 2 were set as shown in Table 1, simulation of the dispersion shifted optical fiber DSF2 was conducted similarly to example 4.

The cutoff wavelength ($\lambda c$) of the dispersion shifted optical fiber DSF2 in this case, the effective area (Aeff) in the case in which a light beam at a wavelength of 1,550 nm propagates, the mode field diameter (MFD) in the case in which a light beam at a wavelength of 1,550 nm propagates, the dispersion value (Disp) of a light beam at a wavelength of 1,550 nm, the dispersion slope (Slope) of a light beam at a wavelength of 1,550 nm, the bending loss (Bloss) of a light beam at a wavelength of 1,550 nm propagating through the dispersion shifted optical fiber DSF2 bent at a diameter of 20 mm, and the loss (Loss) of a light beam at a wavelength of 1,550 nm propagating through the dispersion shifted optical fiber DSF2 linearly constructed were as shown in Table 2.

The variability rate of the bending loss (Bloss VR) in the case in which the ratio between the diameter of the core 1 and the diameter of the cladding 2 fluctuates by 1% was as shown in Table 2.

Tables 1 and 2 are shown below. Note that, Table 1 describes the shape of the refractive index profile of the first segment 11.

TABLE 1

| | Core shape Unit | r0 um | r1 um | r2 um | r3 um | r4 um | Δ1 % | Δ2 % | Δ3 % | Δ4 % |
|---|---|---|---|---|---|---|---|---|---|---|
| Example 1 | Trapezoid | 0.8 | 3.7 | 6.5 | 8.1 | 13.9 | 0.62 | 0.01 | 0.30 | 0.04 |
| Example 2 | Trapezoid | 1.1 | 2.9 | 6.2 | 7.3 | 12.3 | 0.77 | 0.07 | 0.42 | 0.02 |
| Example 3 | Trapezoid | 0.5 | 1.8 | 4.0 | 4.5 | 8.0 | 0.90 | 0.07 | 0.50 | 0.04 |
| Example 4 | Trapezoid | 2.8 | 4.5 | 8.0 | 8.5 | 16.0 | 0.40 | 0.00 | 0.285 | 0.03 |
| Example 5 | Trapezoid | 2.8 | 3.0 | 5.7 | 6.7 | 11.5 | 0.40 | 0.00 | 0.285 | 0.005 |
| Example 6 | Trapezoid | 0.6 | 2.0 | 4.1 | 4.7 | 8.2 | 0.90 | 0.07 | 0.50 | 0.04 |
| Example 7 | Trapezoid | 1.0 | 4.5 | 6.5 | 8.0 | 13.5 | 0.60 | 0.02 | 0.285 | 0.01 |
| Example 8 | Trapezoid | 0.5 | 3.0 | 5.2 | 6.5 | 10.0 | 0.80 | 0.065 | 0.40 | 0.03 |
| Example 9 | Trapezoid | 0.6 | 3.0 | 5.5 | 6.5 | 10.5 | 0.74 | 0.03 | 0.33 | 0.03 |
| Example 10 | Trapezoid | 0.7 | 3.1 | 6.1 | 7.2 | 12.1 | 0.72 | 0.06 | 0.32 | 0.02 |
| Example 11 | Trapezoid | 0.8 | 3.1 | 6.2 | 7.2 | 12.3 | 0.70 | 0.05 | 0.40 | 0.01 |
| Example 12 | Step | — | 2.7 | 6.1 | 7.6 | 11.5 | 0.57 | 0.01 | 0.31 | 0.02 |
| Example 13 | Step | — | 2.6 | 6.4 | 8.4 | 12.6 | 0.50 | 0.06 | 0.29 | 0.01 |
| Example 14 | Step | — | 1.8 | 5.0 | 6.1 | 16.0 | 0.65 | 0.05 | 0.50 | 0.005 |
| Example 15 | Step | — | 2.6 | 6.0 | 7.5 | 15.0 | 0.47 | 0.02 | 0.285 | 0.01 |
| Example 16 | Step | — | 2.0 | 5.0 | 6.1 | 11.0 | 0.67 | 0.06 | 0.35 | 0.025 |
| Exannple 17 | Step | — | 2.3 | 5.7 | 6.9 | 12.0 | 0.55 | 0.03 | 0.32 | 0.01 |
| Example 18 | Step | — | 2.3 | 5.5 | 7.0 | 12.1 | 0.60 | 0.04 | 0.35 | 0.02 |
| Comparative example 1 | Trapezoid | 0.7 | 3.5 | 6.1 | 7.6 | — | 0.67 | 0.02 | 0.33 | — |

TABLE 1-continued

|  | Core shape Unit | r0 um | r1 um | r2 um | r3 um | r4 um | Δ1 % | Δ2 % | Δ3 % | Δ4 % |
|---|---|---|---|---|---|---|---|---|---|---|
| Comparative example 2 | Step | — | 2.5 | 6.0 | 7.5 | — | 0.54 | 0.02 | 0.31 | — |
| Comparative example 3 | Trapezoid | 0.7 | 3.4 | 6.1 | 7.8 | 12.5 | 0.65 | 0.01 | 0.23 | −0.04 |
| Comparative example 4 | Step | — | 2.2 | 4.8 | 7.1 | 11.0 | 0.60 | 0.02 | 0.23 | −0.03 |
| Comparative example 5 | Step | — | 2.7 | 5.1 | 7.4 | 11.5 | 0.50 | −0.03 | 0.25 | −0.08 |
| Comparative example 6 | Step | — | 1.9 | 3.9 | 5.9 | 9.5 | 0.69 | 0.04 | 0.25 | 0.05 |

TABLE 2

|  | λc um | Aeff um^2 | MFD um | Disp ps/nm/km | Slope ps$^2$/nm/km | Bloss dB/m | Loss dB/km | BlossVR % |
|---|---|---|---|---|---|---|---|---|
| Example 1 | 1.44 | 71.5 | 9.7 | 4.2 | 0.078 | 12.0 | 0.197 | 5.6 |
| Example 2 | 1.32 | 73.2 | 9.7 | 4.4 | 0.091 | 11.2 | 0.194 | 5.2 |
| Example 3 | 1.02 | 85.0 | 10.4 | 7.1 | 0.092 | 38.0 | 0.203 | 7.5 |
| Example 4 | 1.23 | 74.2 | 9.9 | 13.0 | 0.058 | 7.2 | 0.198 | 8.3 |
| Example 5 | 1.00 | 79.0 | 10.1 | 9.8 | 0.066 | 29.0 | 0.197 | 8.2 |
| Example 6 | 1.10 | 71.9 | 9.7 | 4.2 | 0.091 | 12.4 | 0.201 | 6.8 |
| Example 7 | 1.44 | 62.0 | 9.2 | 8.8 | 0.070 | 5.0 | 0.2 | 3.5 |
| Example 8 | 1.45 | 87.8 | 10.4 | 5.1 | 0.092 | 15.0 | 0.199 | 3.9 |
| Example 9 | 1.34 | 69.8 | 9.6 | 4.3 | 0.091 | 7.3 | 0.196 | 3.7 |
| Example 10 | 1.36 | 72.7 | 9.7 | 4.0 | 0.090 | 9.3 | 0.196 | 2.8 |
| Example 11 | 1.36 | 72.2 | 9.6 | 4.4 | 0.088 | 9.0 | 0.195 | 3.1 |
| Example 12 | 1.38 | 68.7 | 9.5 | 4.7 | 0.860 | 11.0 | 0.206 | 5.1 |
| Example 13 | 1.45 | 78.0 | 9.9 | 5.0 | 0.087 | 17.2 | 0.203 | 4 |
| Example 14 | 1.43 | 88.8 | 10.3 | 7.0 | 0.092 | 15.0 | 0.204 | 7 |
| Example 15 | 1.35 | 85.1 | 10.5 | 7.5 | 0.085 | 20.0 | 0.2 | 3.3 |
| Example 16 | 1.32 | 64.4 | 9.2 | 3.5 | 0.092 | 5.0 | 0.201 | 3.9 |
| Example 17 | 1.28 | 74.8 | 9.7 | 4.3 | 0.087 | 17.0 | 0.201 | 2.6 |
| Example 18 | 1.21 | 71.9 | 9.6 | 4.3 | 0.088 | 15.8 | 0.199 | 3.8 |
| Comparative example 1 | 1.37 | 71.8 | 9.6 | 4.1 | 0.086 | 8.9 | 0.197 | 16.2 |
| Comparative example 2 | 1.37 | 71.5 | 9.5 | 4.3 | 0.084 | 8.3 | 0.199 | 15.9 |
| Comparative example 3 | 1.29 | 66.0 | 9.3 | 2.8 | 0.081 | 13.1 | 0.199 | 17.4 |
| Comparative example 4 | 1.27 | 68.8 | 9.4 | 4.3 | 0.091 | 7.0 | 0.207 | 21 |
| Comparative example 5 | 1.40 | 73.0 | 9.6 | 4.2 | 0.085 | 11.3 | 0.203 | 17.9 |
| Comparative example 6 | 1.38 | 7.1 | 9.5 | 3.9 | 0.098 | 5.0 | 0.201 | 22.6 |

Table 2 shows that according to the dispersion shifted optical fibers of examples 1 to 18, a change in a bending loss is reduced, even in the case in which the ratio between the core diameter and the cladding diameter is changed. Consequently, it is revealed that according to the dispersion shifted optical fiber according to one or more embodiments of the present invention, a bending loss of propagating light can be reduced, even in the case in which the diameter of the cladding glass body of the optical fiber preform fluctuates due to manufacture.

Specifically, in examples 1 to 11 in which the shape of the refractive index profile of the first segment 11 is in a trapezoid shape, the dispersion shifted optical fibers of examples 7 to 11 achieved an excellent result in which the variability rate (Blass VR) of a bending loss in the case in which the ratio between the diameter of the core 1 and the diameter of the cladding 2 fluctuates by 1% can be reduced to less than 4%. In examples 12 to 18 in which the shape of the refractive index profile of the first segment is a step-index shape, the dispersion shifted optical fibers of the examples 15 to 16 achieved an excellent result in which the variability rate (Bloss VR) of a bending loss in the case in which the ratio between the diameter of the core 1 and the diameter of the cladding 2 fluctuates by 1% can be reduced to less than 4%.

As described above, even in the case in which the ratio between the core diameter and the cladding diameter fluctuates, a change in a bending loss of propagating light can be reduced, and the dispersion shifted optical fiber can be used in the field of optical communications.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims

REFERENCE SIGNS LIST

DSF1, DSF2 . . . dispersion shifted optical fiber
1 . . . core
2 . . . cladding
10 . . . first center segment
11 . . . first segment
12 . . . second segment
13 . . . third segment
14 . . . fourth segment

The invention claimed is:
1. A dispersion shifted optical fiber comprising:
a core, the core further comprising:
a first segment including a center axis of the core,
a second segment that surrounds an outer circumferential surface of the first segment with no gap, a third segment that surrounds an outer circumferential surface of the second segment with no gap, and a fourth segment that surrounds an outer circumferential surface of the third segment with no gap, wherein the first segment further comprises a first center segment having the center axis, a radius $r_0$ of the first center segment is 0.5 μm or more and 2.8 μm or less, a radius $r_1$ of the first segment is 1.8 μm or more and 4.5 μm or less, a radius $r_2$ of the second segment is 4.0 μm or more and 8.0 μm or less, a radius $r_3$ of the third segment is 4.5 μm or more and 8.5 μm or less, a radius $r_4$ of the fourth segment is 8.0 μm or more and 16.0 μm or less, and a relation $r_0 \leq r_1 < r_2 < r_3 < r_4$ is held, a relative refractive index difference $\Delta_0$ of the first center segment to a cladding surrounding the core is 0.4% or more and 0.9% or less, a relative refractive index difference $\Delta_2$ of the second segment to the cladding is 0.00% or more and 0.07% or less, a relative refractive index difference $\Delta_3$ of the third segment to the cladding is 0.285% or more and 0.5% or less, a relative refractive index difference $\Delta_4$ of the fourth segment to the cladding is 0.005% or more and 0.04% or less, and in the first segment, a relative refractive index difference to the cladding is reduced from an outer circumference of the first center segment to an inner circumference of the second segment, and wherein the dispersion shifted optical fiber has a dispersion value of a light beam at a wavelength in a range of 1,530 to 1,625 nm is 2.0 ps/nm/km or more and 13.5 ps/nm/km or less, a dispersion slope of a light beam at a wavelength of 1,550 nm is 0.092 ps/nm²/km or less, a cable cutoff wavelength is a wavelength of 1,450 nm or less, an effective area of a light beam at a wavelength of 1,550 nm is 65 μm² or more and 90 μm² or less, and a mode field diameter of a light beam at a wavelength of 1,550 nm is 9.2 μm or more and 10.5 μm or less.

2. The dispersion shifted optical fiber according to claim 1, wherein the radius $r_0$ of the first center segment is 1.8 μm or more and 2.8 μm or less, the radius $r_1$ of the first segment is 1.8 μm or more and 2.8 μm or less, the radius $r_0$ of the first center segment is matched with the radius $r_1$ of the first segment, the radius $r_2$ of the second segment is 5.0 μm or more and 6.6 μm or less, and the radius $r_3$ of the third segment is 6.1 μm or more and 8.5 μm or less, and the relative refractive index difference $\Delta_0$ of the first center segment to the cladding is 0.4% or more and 0.8% or less, and the relative refractive index difference $\Delta_2$ of the second segment to the cladding is 0.00% or more and 0.06% or less.

3. The dispersion shifted optical fiber according to claim 2, wherein the radius $r_0$ of the first center segment is 2.0 μm or more and 2.6 μm or less, the radius $r_2$ of the second segment is 5.0 μm or more and 6.0 μm or less, the radius $r_3$ of the third segment is 6.1 μm or more and 7.5 μm or less, and the radius $r_4$ of fourth segment is 11.0 μm or more and 15.0 μm or less, and the relative refractive index difference $\Delta_0$ of the first center segment to the cladding is 0.47% or more and 0.67% or less, the relative refractive index difference $\Delta_2$ of the second segment to the cladding is 0.02% or more and 0.06% or less, the relative refractive index difference $\Delta_3$ of the third segment to the cladding is 0.285% or more and 0.35% or less, and the relative refractive index difference $\Delta_4$ of the fourth segment to the cladding is 0.010% or more and 0.025% or less.

4. The dispersion shifted optical fiber according to claim 1, wherein the radius $r_0$ of the first center segment is smaller than the radius $r_1$ of the first segment, the radius $r_0$ of the first center segment is 0.5 μm or more and 1.3 μm or less, the radius $r_1$ of the first segment is 2.0 μm or more and 4.5 μm or less, the radius $r_2$ of the second segment is 5.0 μm or more and 8.0 μm or less, the radius $r_3$ of the third segment is 6.0 μm or more and 8.5 μm or less, and the radius $r_4$ of the fourth segment is 9.0 μm or more and 16 μm or less, and the relative refractive index difference $\Delta_0$ of the first center segment to the cladding is 0.5% or more and 0.9% or less.

5. The dispersion shifted optical fiber according to claim 4, wherein the radius $r_0$ of the first center segment is 0.5 μm or more and 1.0 μm or less, the radius $r_1$ of the first segment is 3.0 μm or more and 4.5 μm or less, the radius $r_2$ of the second segment is 5.2 μm or more and 6.5 μm or less, the radius $r_3$ of the third segment is 6.5 μm or more and 8.0 μm or less, and the radius $r_4$ of the fourth segment is 10.0 μm or more and 13.5 μm or less, and the relative refractive index difference $\Delta_0$ of the cladding surrounding the core of the first center segment is 0.6% or more and 0.8% or less, the relative refractive index difference $\Delta_2$ of the second segment to the cladding is 0.020% or more and 0.065% or less, the relative refractive index difference $\Delta_3$ of the third segment to the cladding is 0.285% or more and 0.4% or less, and the relative refractive index difference $\Delta_4$ of the fourth segment to the cladding is 0.01% or more and 0.03% or less.

6. The dispersion shifted optical fiber according to claim 1, wherein the radius $r_0$ of the first center segment is smaller than the radius $r_1$ of the first segment, and the first segment has a refractive index profile that is trapezoidal.

* * * * *